Figures 1, 2:
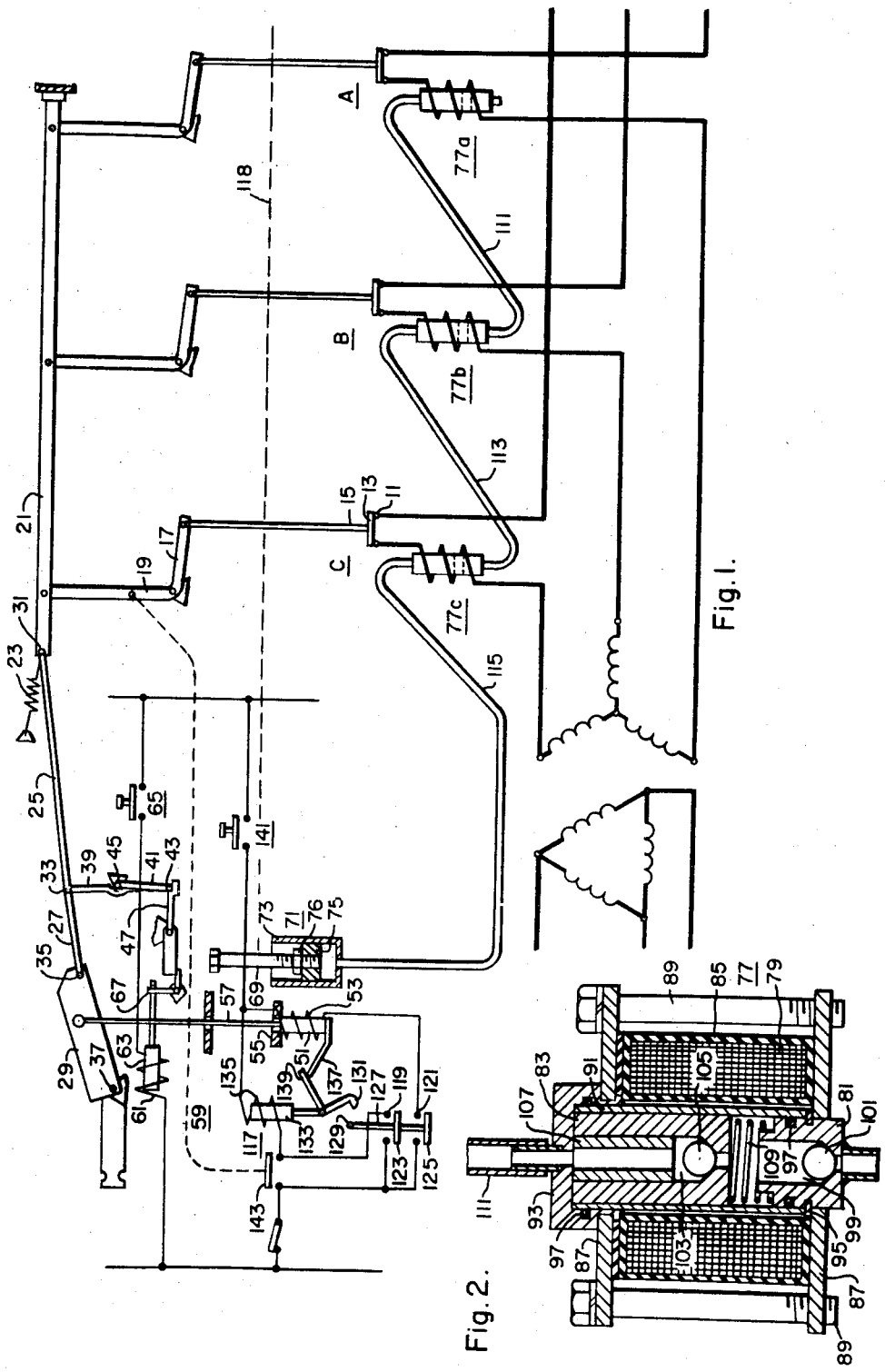

United States Patent Office 2,972,709
Patented Feb. 21, 1961

2,972,709

AUTOMATIC LINE SECTIONALIZER

Leonard V. Chabala, Maywood, Ill., assignor to Westinghouse Electric Corporation, East Pittsburgh, Pa., a corporation of Pennsylvania Filed Mar. 27, 1958, Ser. No. 724,406

4 Claims. (Cl. 317—29)

This invention relates to circuit interrupters and more particularly to polyphase automatic line sectionalizers such as may be used in conjunction with automatic reclosing circuit breakers on feeders in distribution systems.

An object of the invention is to provide a three-phase line sectionalizer embodying counter means operative to count the occurrences of overload currents and to effect opening of the sectionalizer after the occurrence and interruption of a predetermined number of overload currents.

Another object of the invention is to provide a three-phase line sectionalizer embodying counter means responsive to the occurrence of an overload current in any phase of the circuit to count the number of overload currents occurring in any phase circuit and to effect opening of the sectionalizer after the occurrence and interruption of a predetermined number of overload circuits.

Another object of the invention is to provide a polyphase line sectionalizer embodying counter means for counting the occurrence in any phase circuit of overload currents above a predetermined current value and operative to trip the sectionalizer open only after the occurrence and interruption of a predetermined number of such overload currents.

Another object of the invention is to provide in a polyphase line sectionalizer an electrical control means for each phase of said sectionalizer and a single counter means operatively connected to said electrical control means for each phase through a force transmitting means, said counter being advanced one step by the electrical control means for any phase of said sectionalizer in response to the occurrence and interruption of an overload current in that phase.

The invention, both as to structure and operation together with other objects and advantages thereof, will be best understood from the following detailed description thereof when read in conjunction with the accompanying drawing.

In said drawing:

Fig. 1 is a diagrammatic view of a three-phase line sectionalizer embodying the principles of the invention; and Fig. 2 is a vertical sectional view taken through one of the electrical control devices or impulse generators.

The invention is illustrated as applied to a circuit interrupter of the type fully disclosed in copending application Serial No. 334,686, filed February 2, 1953, by James M. Wallace and assigned to the assignee of the present invention.

Line sectionalizers and reclosers are used on distribution lines. The recloser is used between the distribution line and the electric power source. The recloser responds to predetermined overcurrent conditions and quickly opens its line contact, after which it quickly closes the contact, and, if the fault has not automatically cleared itself during the period the line is deenergized, the recloser again quickly opens its line contact and repeats this process for a predetermined number of rapidly repeating cycles, and if the fault persists the recloser then opens its line contact and locks it open thereby deenergizing the line until it can be repaired.

The function of the line sectionalizer is to break the line into sections, each section being controlled by a sectionalizer which counts a predetermined number of interruptions by the recloser, for a number of times which is less than the recloser turns, and then opens the sectionalizer contacts during a deenergized period of the recloser. In this way a faulted section of the line is removed by the sectionalizer before the recloser trips out the entire distribution system.

Referring to Fig. 1 of the drawing for illustrative purposes each pole of the interrupter includes stationary contacts 11 and a movable bridging contact 13 on the lower end of a movable contact rod 15. At their upper ends each of the contact rods 15 is pivotally connected to one arm 17 of a bell crank, the other arms 19 of the bell cranks being pivotally connected to a common pull rod 21.

The pull rod 21 and, hence, the movable contacts 13 are normally held in the closed position against the bias of an opening spring 23 by means of a toggle linkage comprising toggle links 25, 27 and 29. The toggle link 25 is pivotally connected to the pull rod 21 by a pivot pin 31, the toggle links 25 and 27 are pivotally connected together by a knee pivot pin 33 and the toggle links 27 and 29 are pivotally connected by a knee pivot pin 35. The link 29 is mounted on a shaft 37.

The knee pivots 33 and 35 are normally slightly overcenter above a line drawn through the pivot 31 and shaft 37, and the toggle linkage is biased to collapse upwardly by the spring 23. The toggle 25—27 is normally prevented from collapsing upwardly by means of an inverted tripping toggle comprising toggle links 39 and 41. The toggle link 39 is pivotally connected to the knee pin 33 of the toggle 25—27 and to one end of the toggle link 41 by a knee pin 43, the other end of the toggle link 41 being pivoted on a fixed pivot 45. The tripping toggle 39—41 is normally restrained in its holding position by the engagement of the knee pin 43 with a latch 47 pivotally mounted on a fixed pivot 49.

The toggle 27—29 is held in its slightly overset position by engagement of the armature 51 of a closing solenoid 53 with a fixed stop 55, the armature 51 being connected by a rod 57 to the toggle link 29.

Opening of the interrupter may be effected from a remote point by energization of a tripping electromagnet 59 comprising an energizing coil 61 and a movable armature 63. Energization of the tripping magnet 59 is effected by closing a manual switch 65 which is connected in series with the coil 61 of the trip magnet. When energized the trip magnet attracts its armature 63 and actuates a latch release lever 67 which moves the latch 47 to unlatching position. This releases the tripping toggle 39—41 and permits the toggle 25—27 to collapse upwardly whereupon the spring 23 moves the pull rod 21 toward the left and simultaneously opens the contacts for all of the phases. During this movement the weight of the armature 51 causes clockwise rotation of the toggle link 29 during which rotation the tripping toggle 39—41 is reset and relatched and the mechanism is in condition for a closing operation.

The latch 47 is actuated to automatically trip the interrupter open by a trip rod 69 forming part of a counting device indicated generally at 71. The counter 71 comprises a cylinder 73 in which a piston 75 adjustably attached to the lower end of the trip rod 69 is movable. The trip rod 69 threadedly engages a tapped hole in the piston 75 and is locked in position by a lock nut 76. By varying the position of the trip rod 69 relative to the piston 75 the counting device may be adjusted to count one, two or three interruptions before it trips the sectionalizer open. Each phase of the circuit is provided with an electromagnet fluid pump or impulse generator indicated generally at 77 and each pump being connected to pump a predetermined amount of fluid to the counter cylinder 73 below the piston 75 to advance the piston and trip rod 69 one step for each overload current and interruption thereof. The three electromagnetic pumps 77a, 77b and 77c for the several phases are the same and, referring to Fig. 2, comprise generally an energizing coil 79, a fixed core member 81 and a movable core 83. The coil 79 is surrounded by insulation 85 and is mounted between upper and lower plates 87 which are held together by bolts 89. The moving core member 83 is enclosed in a cylinder 91 with a close fit, the cylinder 91 being sealed at the top by a cap 93 and at the bottom by a retaining ring 95 which engages a notch in the fixed core member 81 to hold the latter in place. Ring seals 97 are provided to seal the cylinder 91 between the cap 93 at the top and the fixed core member 81 at the bottom.

The fixed core member 81 has a bore 99 extending axially therethrough with a reduced portion at the lower end thereof and a check valve 101 is disposed in the bore 99. The movable core member 83 is also provided with an axial bore 103 having a reduced portion at its lower end and a check valve 105 disposed thereon. A cylindrical member 107 having an axial bore therein is inserted in the upper portion of the bore 103 with a press fit. The movable core member or armature 83 is normally biased by a spring 109 upwardly against the cap 93.

The pumps 77 are immersed in oil or other suitable fluid, and the pump 77a for the phase indicated at A is open at the bottom of the fixed core member 81. The upper end of the pump 77a for phase A is connected by an insulating tube 111 to the bottom of the fixed core member 81 of the pump 77b for phase B. The top of the pump for phase B is connected by a tube 113 of insulating material to the bottom of the pump for phase C, and the top of the pump 77c for phase C is connected by an insulating tube 115 to the bottom of the cylinder 73 of the counter 71. The pumps 77 for the three phases of the interrupter are thus connected in series.

The three-phase line sectionalizer may be housed in a tank such as is shown in the previously mentioned copending application of James M. Wallace and is immersed in oil up to approximately the level indicated by the dotted line 118. When a fault current above a predetermined value occurs in any pole of the interrupter the series coil 79 is energized sufficiently to attract the movable core 83 downwardly compressing the spring 109. This causes the oil which was displaced by the movement of the armature 83 to flow upwardly through the check valve 105. When the fault current is interrupted by an external device such, for instance, as an automatic reclosing circuit breaker, the coil 79 is deenergized and the spring 109 returns the movable core 83 upwardly to its normal position. This forces the previously displaced oil out of the top of the pump and causes an equal volume of oil to flow through all three of the pump units 77a, 77b and 77c and through the insulating tubes 111, 113 and 115 to the counter cylinder 73 and advances the piston 75 and trip rod 69 upwardly one step. The counting piston 75 will be advanced one step by each of a plurality of closely successive fault currents and interruptions whether the fault currents occur in one phase or simultaneously in two or three phases. After a predetermined number of fault currents and interruptions have occurred the trip rod 69 will engage and actuate the latch 47 to effect opening of the contacts for all of the poles of the interrupter in the manner previously described. However, if the fault is not a continuing one and the circuit conditions return to normal after one or two reclosing operations of the remote automatic reclose, the counting piston 75 will slowly reset by displacement of the fluid trapped beneath it through the small clearance between the piston and the bore of the cylinder 73.

The contacts for the several poles of the interrupter are closed simultaneously by energization of closing coil 53 which attracts its armature 51 upwardly rotating the toggle link 29 counterclockwise which moves the toggle 27—29 overcenter. Since at this time the tripping toggle 39—41 is latched up, straightening the toggle 27—29 thrusts the pull rod 21 toward the right and closes the contacts for all of the poles.

The closing coil 53 is energized by means of a relay 117 having two sets of spaced stationary contacts 119 and 121 with which cooperate movable contacts 123 and 125 mounted on a contact rod 127. The upper end of the rod 127 is provided with a pin 129 adapted to be engaged by a latch 131 pivotally mounted on the lower end of an armature 133 of the relay 117 which is also provided with an energizing winding 135. The latch 131 is normally biased by a spring (not shown) in a direction to cause its engagement with the pin 129 on the contact rod 127.

Secured to the armature 51 is an arm 137 which in the closed position of the interrupter engages an arm 139 on the latch 131 and holds the latter disengaged from the pin 129 with the contacts 123 and 125 in the open position. When the interrupter is tripped open, as previously described, the closing armature 51 drops down carrying the arm 137 therewith permitting the latch 131 to engage the pin 129. When the coil 135 of the relay 117 is energized, which may be effected by closing a manual switch 141, the armature 133 is attracted upwardly closing the contacts 123 and 125 to effect energization of the closing coil 53. As the armature 51 moves upwardly the arm 137 engages the arm 139 and disengages the latch 131 from the pin 129 permitting the relay contacts 123 and 125 to open and effect deenergization of the closing coil 53. An auxiliary switch 143 which is open when the interrupter is closed and closes when the interrupter is opened is provided to permit energization of the relay 117 in the open position of the interrupter and prevent such energization when the interrupter is in the closed position.

It will be seen that the invention provides a counting device common to the several poles of the interrupter which is advanced a single step in response to the occurrence and interruption of a fault current occurring in any one pole of the interrupter, and is also advanced a single step in response to the simultaneous occurrence and interruption of fault currents in any two or all of the poles of the interrupter. After the interruption of a predetermined number of closely successive fault currents in any of the poles or simultaneously in any combination of poles the counter means will trip the interrupter open.

Having described the invention in accordance with the provisions of the patent statutes, it is to be understood that various changes and modifications may be made in the particular embodiment disclosed without departing from the spirit of the invention.

I claim as my invention:

1. A multi-pole circuit interrupter comprising relatively movable contacts for each pole and contact operating mechanism releasable to effect automatic opening of the contacts for all of said poles, trip means operable to release said operating mechanism, a fluid transmission system having an output and comprising a plurality of fluid pumps connected in series, each pump corresponding to a different pole and including means for providing a displacement of a predetermined amount of fluid through the pump in response to each circuit interruption condition at the corresponding pole, each pump including means for passing fluid in response to a fluid displacement operation of any other pump, and a fluid operated counter connected to said output and including a member advanceable in response to each displacement operation in the transmission system to operate said trip means in response to a predetermined number of fluid displacement operations.

2. A multi-pole circuit interrupter comprising relatively movable contacts for each pole and contact operating mechanism releasable to effect automatic opening of the contacts for all of said poles, trip means operable to release said operating mechanism, a fluid transmission system having an output and comprising a plurality of fluid pumps connected in series, each pump corresponding to a different pole and including means for providing a displacement of a predetermined amount of fluid through the pump in response to predetermined circuit conditions at the corresponding pole, each pump including means for passing fluid in response to a fluid displacement operation of any other pump, and a fluid operated counter connected to said output and including a member advanceable in response to each displacement operation in the fluid transmission system to operate said trip means in response to a predetermined number of fluid displacement operations.

3. A multi-pole circuit interrupter comprising relatively movable contacts for each pole and contact operating mechanism releasable to effect automatic opening of the contacts for all of said poles, trip means operable to release said operating mechanism, a fluid transmission system having an output and comprising a plurality of fluid pumps connected in series, each pump corresponding to a different pole and including means actuable to provide a displacement of a predetermined amount of fluid through the pump, each pump including electro-responsive means for actuating the pump in response to each circuit interruption condition at the corresponding one of the poles, and each pump including valve means for passing fluid through the pump when another pump is being actuated, and a fluid operated counter connected to said output and including a member advanceable in response to each displacement operation in the fluid transmission system to operate said trip means in response to a predetermined number of fluid displacement operations.

4. A multi-pole circuit interrupter comprising separable contact means for each pole and means releasable to effect separation of the contact means for all of the poles, a fluid transmission conduit including a plurality of series connected fluid chambers, one chamber for each pole, an electro-responsive piston member in each chamber and mounted for movement longitudinally of the conduit, spring means in each chamber urging the piston to one end of the chamber, electro-responsive means for each pole and operable to urge the corresponding piston to the other end of the fluid chamber to displace a predetermined amount of fluid in the conduit in response to circuit interruption conditions at the corresponding pole, fluid pressure responsive valve means in each piston member for preventing passage of fluid through the piston only when the piston is moving from said other end to said one end of the corresponding chamber, and a fluid responsive counter operable to count the number of fluid displacement operations occurring in the conduit and including means for releasing said releasable means when a predetermined number of displacement operations are counted.

References Cited in the file of this patent

UNITED STATES PATENTS

| | | |
|---|---|---|
| 1,747,044 | Bainbridge | Feb. 11, 1930 |
| 1,751,380 | Anderson | Mar. 18, 1930 |
| 1,831,338 | Brown | Nov. 10, 1931 |
| 2,011,361 | Hammond | Aug. 13, 1935 |
| 2,909,709 | Metz | Oct. 20, 1959 |